United States Patent

Morrison et al.

[15] 3,656,287
[45] Apr. 18, 1972

[54] ADJUSTABLE SUPPORT FOR TREE SHAKING MECHANISM

[72] Inventors: Frank W. Morrison; Jerry E. Morrison, both of 2408 E. 14th Street, Route 1, The Dalles, Oreg. 97338

[22] Filed: June 23, 1969

[21] Appl. No.: 835,419

[52] U.S. Cl. .......................................... 56/328 TS, 248/13
[51] Int. Cl. ........................................................ A01g 19/00
[58] Field of Search .................................. 56/328, 328 TS; 248/2-16

[56] References Cited

UNITED STATES PATENTS

| | | | |
|---|---|---|---|
| 2,614,807 | 10/1952 | Curtis | 248/13 |
| 2,674,500 | 4/1954 | Hukari | 56/328 X |
| 2,891,372 | 6/1959 | Goodwin | 56/328 |
| 3,121,304 | 2/1964 | Herbst | 56/328 |
| 3,377,786 | 4/1968 | Edgemond, Jr. | 56/328 |
| 3,401,514 | 9/1968 | Clark | 56/328 |
| 3,457,712 | 7/1969 | Gould et al. | 56/328 |
| 3,493,200 | 2/1970 | Huffman | 248/2 X |

Primary Examiner—Russell R. Kinsey
Attorney—Eugene M. Eckelman

[57] ABSTRACT

The support of the invention includes a base on which an upright standard is rotatably mounted. Supported on the upright standard and rotatable on its own axis which extends at right angles to the axis of the standard is an elongated arm having an upright axis pivot joint intermediate its ends. The arm is also tiltable relative to the horizontal. Individual fluid operated cylinders are provided to rotate the upright standard relative to the base, to rotate the arm on its own axis, to vary the angular disposition of the two arm sections at their jointed connection, and to tilt the arm relative to the base. The outer end of the arm has an angular portion on which an upright head is supported including further adjustments for manipulation of a shaker mechanism. Such head has rotatable support on an upright axis and supports a shaker rod for longitudinal or axial movement of the rod, as well as rotating movement of the rod on its own axis. In addition, the shaker rod is supported on the head for tilting adjustment relative to the horizontal. Fluid operated cylinders are employed to rotate the head on its upright axis, to move the rod axially, to rotate the rod on its own axis, and to tilt the rod.

10 Claims, 5 Drawing Figures

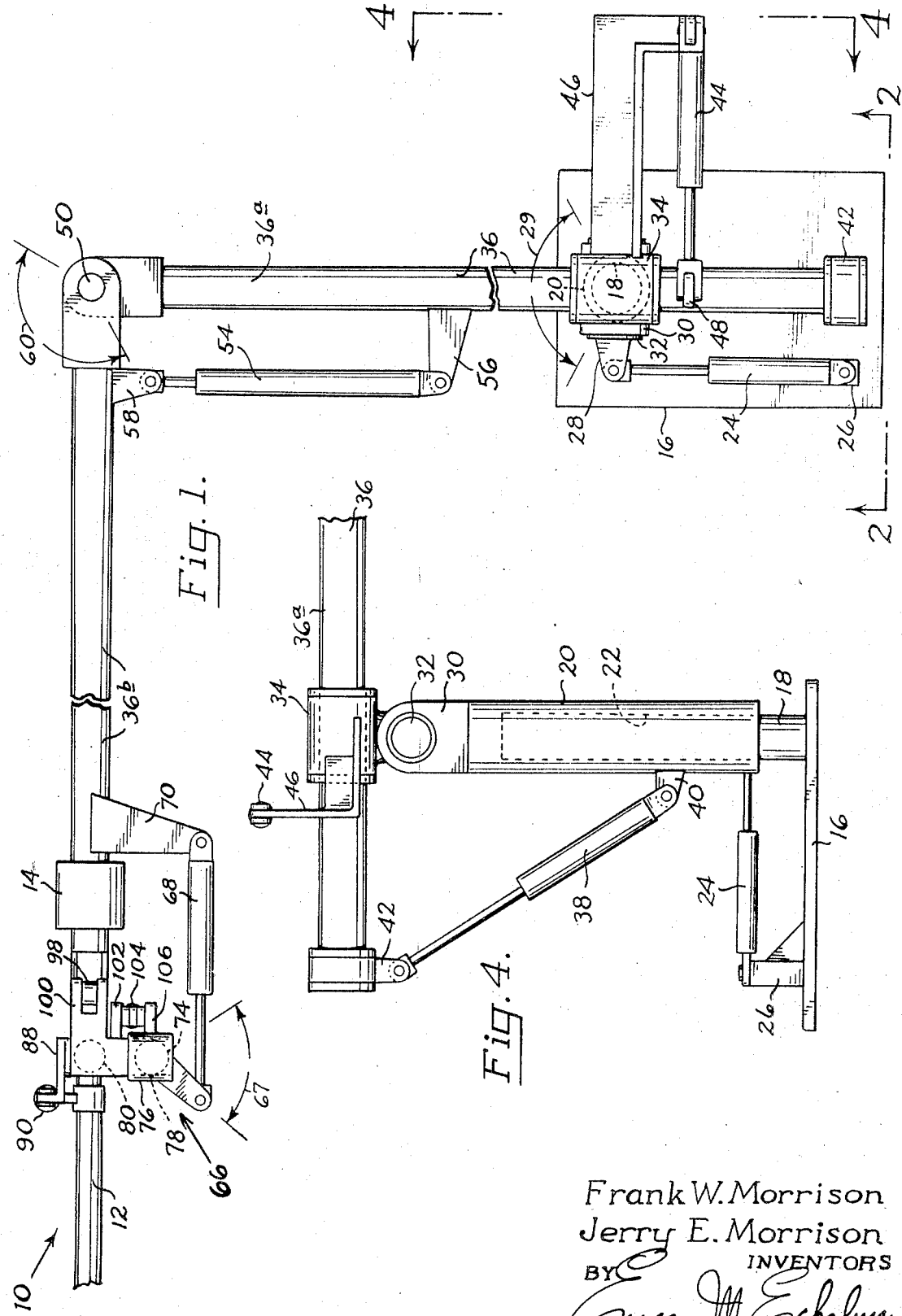

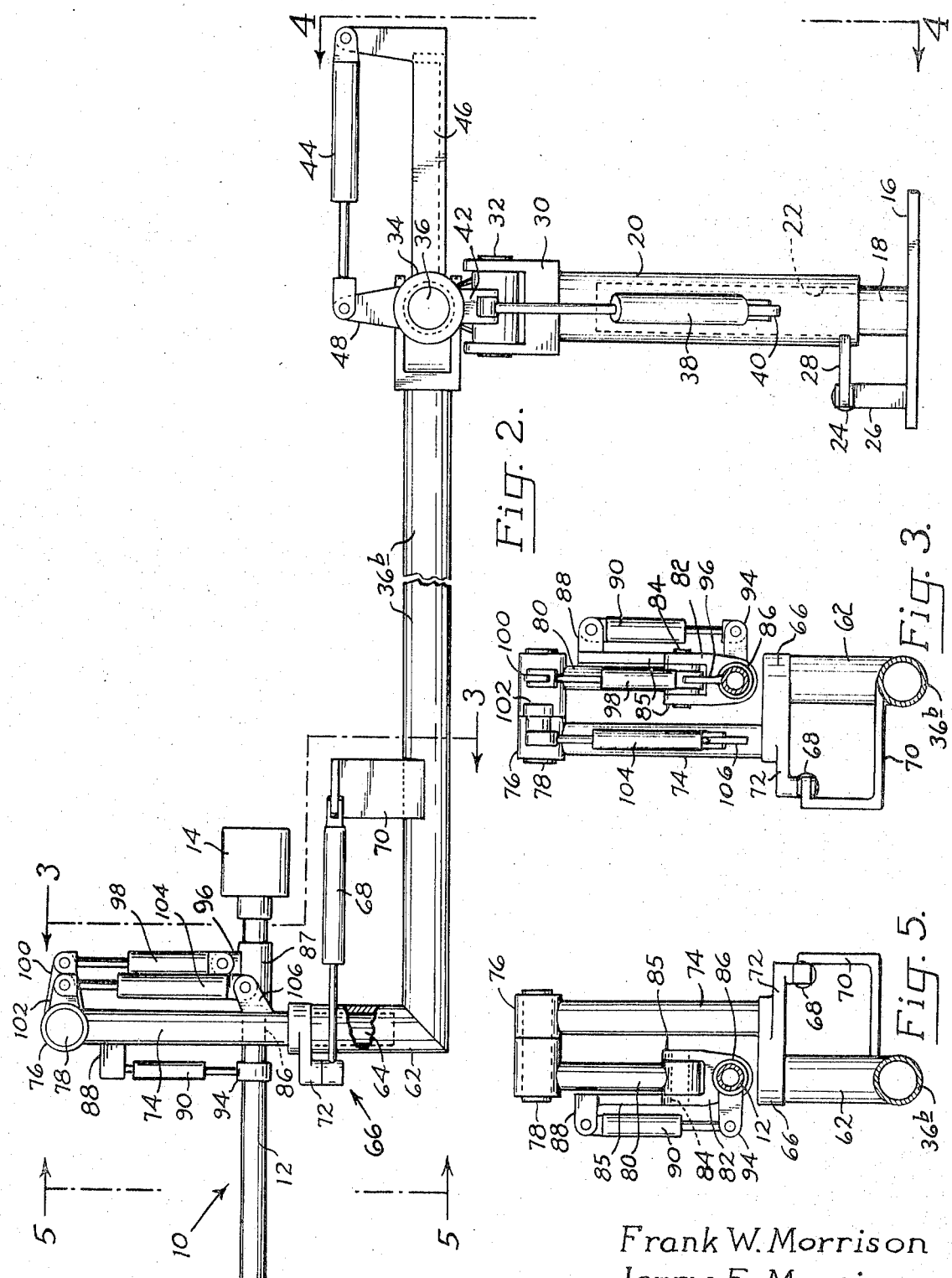

3,656,287

ADJUSTABLE SUPPORT FOR TREE SHAKING MECHANISM

BACKGROUND OF THE INVENTION

This invention relates to improvements in adjustable supports for tree shaking mechanism.

Various types of shaking mechanisms have been employed for removing fruit and nuts from trees by engaging portions of the tree and shaking it vigorously. The fruit or nuts are then collected from the ground or from suitable collecting apparatus placed under the tree. In most cases, it is desirable that individual branches be shaken in order that the most efficient removal of the product be accomplished. Such requires an extremely manueverable support for the shaking arm in order that the various branches can be reached without continual shifting of a support carrier. Good manueverability and adjustment of the support for the shaker is particularly desirable when the shaker is mounted on apparatus which includes collecting means for the fruit or nuts because such apparatus necessarily is large and not easily moved. Supports for shaking mechanism of the type described heretofore provided do not have the adjustment desired for efficient engagement of tree branches.

SUMMARY OF THE INVENTION

According to the present invention, a support for tree shaking mechanism has a novel structure which provides for efficient positioning of the shaker in order that selected portions of trees to be shaken can be engaged with a minimum of relocation of supporting carrier means.

More particularly, the invention provides a shaker support of the type described having a novel combination of adjustment means including a standard rotatable on an upright axis, arm means on the standard rotatable on its own axis and tiltable relative to the standard, the arm means also being jointed intermediate its ends to assume different angular shapes, and a head on the end of the arm for supporting a shaker rod mechanism, such head being rotatable on an upright axis and also providing rotatable support for the shaker rod on its own axis as well as angular tilting adjustment of the shaker rod relative to the horizontal and axial movement thereof. A further feature of the present shaker support is that it may be combined with collecting apparatus and due to its adjustability contributes to the efficient usage of such collecting apparatus.

The invention will be better understood and additional objects and advantages will become apparent from the following description taken in connection with the accompanying drawings which illustrate a preferred form of the device.

BRIEF DESCRIPTION OF THE DRAWINGS

FIG. 1 is a foreshortened plan view of the present support for tree shaking mechanism;

FIG. 2 is an elevational view of such support, taken on the line 2—2 of FIG. 1 and also being foreshortened;

FIG. 3 is a vertical sectional view taken on the line 3—3 of FIG. 2;

FIG. 4 is a fragmentary elevational view taken on the line 4—4 of FIG. 1; and

FIG. 5 is a vertical sectional view taken on the line 5—5 of FIG. 2.

DETAILED DESCRIPTION OF A PREFERRED EMBODIMENT

The shaker support of the present invention may be mounted on tractors, tricycle carriers, jeeps, pickup trucks, or on collecting units made especially for collecting fruit or nuts shaken from trees. The numeral 10 in FIGS. 1 and 2 designates a shaker unit of common usage which employs an elongated rod 12 having a motorized element 14 on its inner end for applying a shaking motion to the rod and having a branch grasping head (not shown) at its outer end. Such head structures comprise jaw members for grasping a branch and are of well known structure. Control mechanism for the motorized shaker 14 is not detailed herein since such also comprises well known structure.

The present invention is concerned with a novel support for the shaker unit 10 in order that the latter can be positioned as required to engage selected tree branches. The support comprises a base 16, FIGS. 1, 2 and 4, which may serve as mounting means for connection of the support to a carrier unit of the type mentioned hereinbefore. An upright shaft 18 is integrated with the base and rotatably supports a standard 20, the latter member having a bottom opening socket 22 for rotatably receiving the shaft. As best seen in FIGS. 1 and 4, standard 20 has powered adjustable rotation on the shaft 18 by a fluid operated cylinder 24 having its base end pivotally connected to a bracket 26 secured to the base 18. The piston rod end of the cylinder 24 is pivotally connected to a laterally projecting lever arm 28 secured to the standard 20. Cylinder 24 is capable of rotatably moving the standard 20 in an arc of movement designated by the reference numeral 29 in FIG. 1.

Standard 20 supports a bifurcated bearing member 30 on its upper end providing journaled support for a cross shaft 32 in turn supporting a bearing member 34 at right angles thereto. An arm 36 is rotatably supported in the bearing member 34 and is tiltable with its shaft 32 relative to the standard 20 by means of fluid operated cylinder 38 having a pivotal connection at its base end with an ear 40 secured on a lower portion of the standard 20 and having its piston rod end connected to a rearwardly projecting portion of the arm 36 by a suitable clamp 42.

Arm 36 is rotatable on its own axis in bearing member 34 by a fluid operated cylinder 44, FIGS. 1 and 2, pivotally connected at its base end to an elongated laterally projecting bracket 46 secured to bearing member 34 and pivotally connected at its piston rod end to a lever arm 48 integrated with the arm 36.

Arm 36 is jointed at 50 intermediate its ends whereby two sections 36a and 36b thereof are capable of angular adjustment relative to each other to change the shape of the arm. Joint 50 is on an upright axis. Angular adjustment of the arm sections 36a and 36b is accomplished by a fluid operated cylinder 54 having a pivot connection at its base end with an ear 56 secured to the arm section 36a and having a pivot connection at its piston rod end with an ear 58 secured to the arm section 36b. As apparent, the fluid operated cylinder 54 operates at the joint between the arm portions 36a and 36b whereupon such arm can be angularly shaped as desired. Cylinder 54 is capable of operating the arm section 36b in the arc designated by the reference numeral 60 in FIG. 1.

According to the invention thus far described, the entire unit can be rotated on a vertical axis, namely, on the shaft 18, the arm 36 can be tilted relative to the horizontal on shaft 32, the arm 36 can be rotated on its own axis in sleeve bearing 34, and said arm can be shaped at the joint 50, all to the requirements necessitated for reaching a selected branch of a tree.

The end of arm portion 36b has an upright open top extension 62, FIGS. 2, 3 and 5, which rotatably receives and supports a shaft 64 forming an integral part of a head member 66. Such head member is rotatably adjusted on the extension 62 through an arc 67, FIG. 1, by means of a fluid operated cylinder 68 having a pivot connection at its base end with an upright bracket 70 integrated with the arm portion 36b and having a pivot connection at its piston rod end with a lever arm 72 projecting integrally and laterally from the head member 66.

Head member 66 has an integral upright post 74, FIGS. 2, 3 and 5, integrally supporting a sleeve bearing 76 on its upper end. Bearing 76 rotatably supports a cross shaft 78 on which a depending arm 80 is integrally supported. Arm 80 is pivotally connected to a bracket 82 at its lower end by means of a shaft 84, the bracket 82 having bifurcated arms 85 for providing the pivotal connection with the shaft 84. Bracket 82 has a bottom bore 86 and a rearwardly extending tubular portion 87 disposed longitudinally relative to the head member 66, ad this bore and tubular portion rotatably support the rod 12. Such rod is thus supported on the arm 80 and is rotatable on its own axis. One of the arms 85 is extended upwardly and has an outturned upper end portion 88 to which is pivotally connected the base end of a fluid operated cylinder 90 having its piston rod end pivotally connected to a laterally projecting lever arm 94 integrated with the shaker rod 12. Cylinder 90 is thus arranged upon actuation thereof to rotate the rod 12 on its own axis, and in addition, the rod and its depending support can swing longitudinally of the head 66 on the shaft 78.

Tubular portion 87 has an integral ear 96, FIG. 2, spaced rearwardly from bracket 82 to which is pivotally connected the base end of an upright fluid operated cylinder 98. The piston rod end of the cylinder 98 is pivotally connected to an ear 100 projecting integrally from the upper end of the arm 80 in a rearward direction longitudinally of the rod 12. Actuation of the cylinder 98 serves to tilt the rod 12 with relation to the horizontal or more accurately with relation to arm 36.

The upper end of arm 80 also has an integral rearwardly projecting ear 102, FIGS. 1 and 3, to which is pivotally connected the piston rod end of an upright fluid operated cylinder 104 having its base end pivotally connected to an ear 106 which extends integrally from the post 74 in a rearward longitudinal direction of the rod 12. The cylinder 104 operating between a bottom stationary connection with the post 74 and an upper connection with rearwardly projecting ear 102 on arm 80 is capable of adjustably moving the rod 12 axially. Such forward and reverse movement amounts to a fine axial adjustment of the rod 12 for grasping a branch by the jaw end of the rod 12.

OPERATION

In the operation of the present shaker support, the base 16 is mounted on a suitable carrier vehicle capable of movement to the fruit or nut trees. Upon proper positioning of the carrier vehicle, the rod is manipulated into place with regard to a desired branch by suitable operation of the cylinders 24, 38, 44, 54, 68, 90, 98, and 104. The major adjustment for positioning the rod 12 is by the support mechanism comprising the arm 36 and the upright standard 20, namely, by rotation of the standard 20, tilting of the arm 36 relative to the horizontal, rotation of such arm on its own axis, and selected breaking of the arm on its joint 50. The fine adjustment of the rod to the branch is accomplished by the cylinders on the head 66, namely, the rotation of the rod 12 on its own axis, tilting thereof relative to the horizontal, and forward and reverse movement along its axis. By means of the rough and fine adjustments it is possible to thread the rod 12 through the tree to reach a certain branch, and in many cases the entire tree can be harvested without readjusting the position of the carrier around the tree. Cylinder 54 operates the arm segment 36b through an arc greater than 90°, as shown by the arrow 60 in FIG. 1, and such arm assembly upon adjustment between its extreme angular positions is capable, together with the tilting and rotatable adjustments thereof, of threading the rod through the tree as desired. The same is true of the rod 12 in that by its novel mounting on the head 66 it can be rotated on its own axis, adjusted axially, and tilted relative to the horizontal.

Upon grasping a branch with the jaws of the rod 12, all the fluid cylinders are locked against movement with the exception of cylinder 104 since the shaker motor 14 provides axial vibration of the rod 12 and such cylinder must be released to allow such vibration. The other cylinders, being locked, prevent any appreciable weight of the apparatus from bearing on the branch. The operator controls the shaker rod from a position adjacent to the shaker motor 14 and stands on the ground or on a platform on the carrier vehicle.

It is to be understood that the form of our invention herein shown and described is to be taken as preferred examples of the same and that various changes in the shape, size and arrangement of parts may be resorted to without departing from the spirit of our invention. For example, the support of the present invention, although being described with the housing 20 in an upright position, may be carried on a vehicle in any other position, such as with the housing 20 extending laterally in a horizontal direction or even depending downwardly. The controls for the eight hydraulic cylinders on the present support, as well as the hydraulic lines, are not detailed herein in view of their common use in the art.

Having thus described our invention, we claim:

1. An adjustable shaker support comprising
   a. a base,
   b. an elongated arm,
   c. means mounting said arm on said base,
   d. a head on said arm,
   e. shaker apparatus on said head,
   f. and means connected between said head and arm providing adjustable rotation of said head and shaker apparatus on an axis substantially perpendicular to the axis of said arm.

2. An adjustable shaker support comprising
   a. a base,
   b. an elongated arm,
   c. means mounting said arm on said base,
   d. a head on said arm,
   e. shaker apparatus on said head,
   f. and means connected to said head and arranged for connection to the shaker apparatus for adjustably moving the latter forward and backward in an axial direction.

3. An adjustable shaker support comprising
   a. a base,
   b. an elongated arm,
   c. means mounting said arm on said base,
   d. a head on said arm,
   e. shaker apparatus on said head,
   f. and means connected to said head and arranged for connection to said shaker apparatus providing adjustable angular tilting of the shaker apparatus relative to said head.

4. The adjustable shaker support of claim 3 including
   a. means connected to said head arranged for connection to the shaker apparatus for adjustably moving the latter forward and backward in an axial direction,
   b. means connected between said head and arm providing adjustable rotation of said head and shaker apparatus on an axis substantially perpendicular to the axis of said arm,
   c. and means connected to said head and arranged for connection to said shaker apparatus providing adjustable angular tilting of the shaker apparatus relative to said head.

5. An adjustable shaker support comprising
   a. a base,
   b. an elongated arm,
   c. means mounting said arm on said base providing adjustable axial rotation of said arm, adjustable angular tilting of said arm relative to said base, and adjustable rotation of said arm on an axis substantially perpendicular to the axis of said arm,
   d. and means adjacent to one end of said arm arranged to support shaker apparatus.

6. The adjustable shaker support of claim 5 wherein said means arranged to support the shaker apparatus comprises
   a. a head,
   b. and means connected to said head and arranged for connection to said shaker apparatus providing adjustable axial rotation of the shaker apparatus.

7. The adjustable shaker support of claim 5 wherein said means arranged to support the shaker apparatus comprises
   a. a head,
   b. means connected to said head and arranged for connection to said shaker apparatus providing adjustable angular tilting of the shaker apparatus relative to said head.

8. The adjustable shaker support of claim 5 wherein said means arranged to support the shaker apparatus comprises
   a. a head, b. and means connected between said head and arm providing adjustable rotation of said head and shaker apparatus on an axis substantially perpendicular to the axis of said arm.

9. The adjustable shaker support of claim 5 wherein said means arranged to support the shaker apparatus comprises
   a. a head,
   b. and means connected to said head and arranged for connection to the shaker apparatus for adjustably moving the latter forward and backward in an axial direction.

10. The adjustable shaker support of claim 5 wherein said means arranged to support the shaker apparatus comprises
    a. a head,
    b. means connected to said head and arranged for connection to said shaker apparatus providing adjustable axial rotation of the shaker apparatus,
    c. means connected to said head and arranged for connection to said shaker apparatus providing adjustable angular tilting of the shaker apparatus relative to said head,
    d. means connected between said head and arm providing adjustable rotation of said head and shaker apparatus on an axis substantially perpendicular to the axis of said arm,
    e. and means connected to said head and arranged for connection to the shaker apparatus for adjustably moving the latter forward and backward in an axial direction.

* * * * *